United States Patent

[11] 3,600,976

| [72] | Inventor | Lubomyr O. Hewko |
| | | Port Clinton, Ohio |
| [21] | Appl. No. | 14,299 |
| [22] | Filed | Feb. 26, 1970 |
| [45] | Patented | Aug. 24, 1971 |
| [73] | Assignee | General Motors Corporation |
| | | Detroit, Mich. |

[54] FRICTION DRIVE MECHANISM
11 Claims, 10 Drawing Figs.

[52] U.S. Cl. ................................................ 74/798
[51] Int. Cl. .......................................... F16h 13/06,
                                                  F16h 15/50
[50] Field of Search .......................... 74/798, 796

[56] References Cited
UNITED STATES PATENTS

| 3,021,730 | 2/1962 | Banker | 74/798 |
| 3,208,307 | 9/1965 | Agren | 74/798 |
| 3,407,671 | 10/1968 | Prosen | 74/798 |

*Primary Examiner*—Leonard H. Gerin
*Attorneys*—Warren E. Finken, A. M. Heiter and John P. Moran ABSTRACT: A power-transmitting and speed-reducing friction drive mechanism including a housing, input and output shafts, an outer ring member, an inner ring member, an axially extending cylindrical carrier member intermediate the outer and inner ring members and driven by ball planets frictionally contacting both ring members, the carrier member having a plurality of equally spaced radial slots formed therein for receiving oppositely disposed hydrodynamic bearing inserts or shoes. The bearing inserts are conical at their outer peripheries, and each includes one flat bearing face for axial, radial and/or rotational movement on one of the sides of each of the radial slots, and one partial-spherical or concave bearing face for receiving a portion of each of a plurality of ball planets to transmit force from the ball planets to the carrier, and provide for rotation of the ball planets relative to the bearing insert and movement of the bearing insert relative to the carrier.

INVENTOR.
Lubomyr O. Hewko
BY
John P. Moran
ATTORNEY

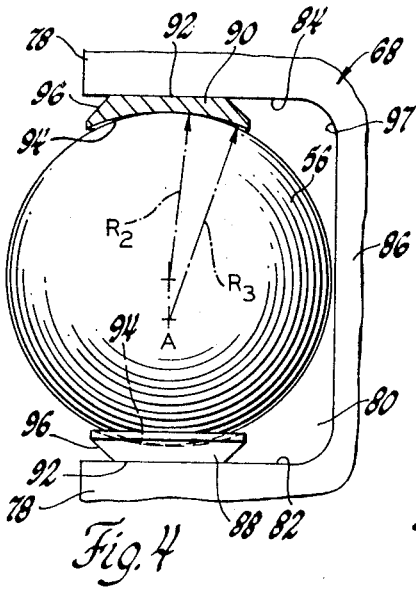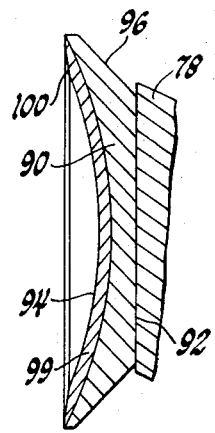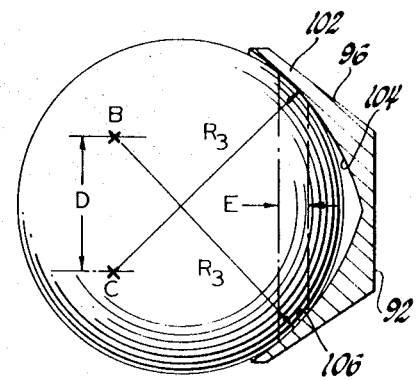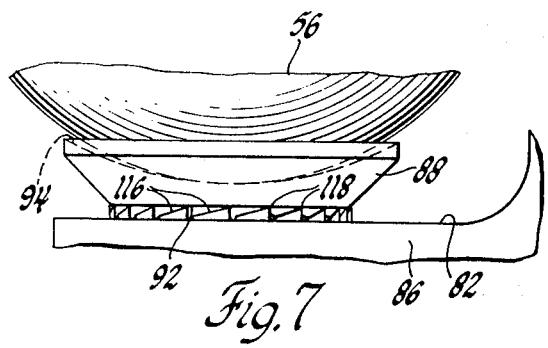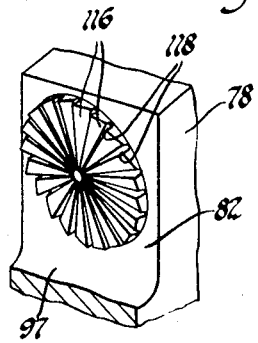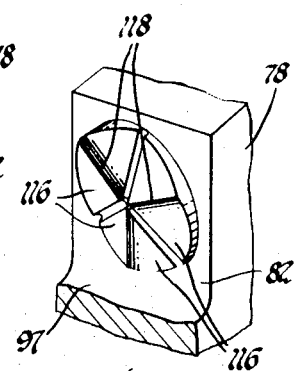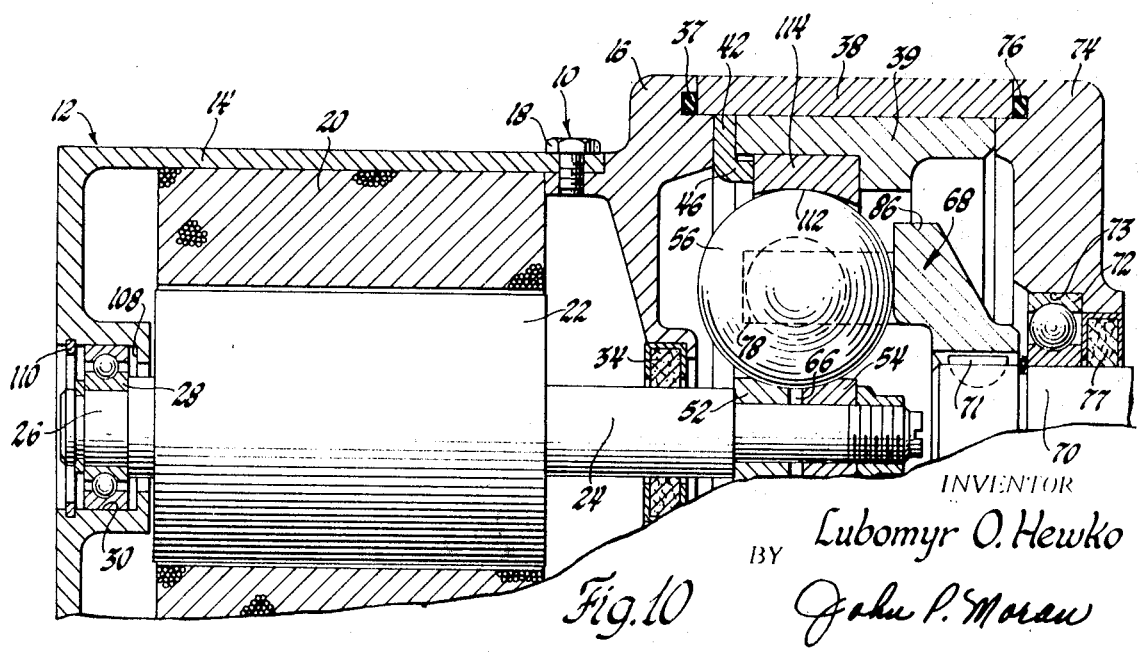

FRICTION DRIVE MECHANISM

This invention relates to a friction drive mechanism, and more particularly to a friction drive mechanism including inner and outer races and intermediate ball planets in frictional contact therewith.

The friction-type speed reducer is desirable for use in a mechanical door-operating mechanism, for example, wherein geared drives are undesirable because of objectionable tooth-mesh noise and backlash noise upon reversing. Such noise is eliminated in the traction drive because preloading of the balls and races provides quiet, continuous power-transfer and eliminates backlash.

While ball frictional drive devices are known, they generally include ball planets which are rotatably mounted in cylindrically shaped pockets formed at equal intervals around a carrier member, such pockets having axes parallel to the axis of the input or output shafts.

An object of the invention is to provide a power-transmitting mechanism wherein a cylindrically-shaped carrier member includes substantially equally spaced, parallel-sided radial slots for the insertion of bearing inserts or shoes, each having a flat side for being slidably seated on a wall of the slot, and an opposed partial-spherical or concave surface for receiving a portion of a ball planet, the partial-spherical surfaces of the inserts having slightly larger radii than the balls, providing a substantially wedge-shaped opening therebetween for receiving a suitable lubricant and serving as hydrodynamic journal bearings for the ball planets.

A further object of the invention is to provide a power-transmitting mechanism wherein the bearing inserts are mounted in pairs with their flat surfaces in substantially full face contact with oppositely disposed parallel walls of radial slots formed in a cylindrical carrier for free axial, radial and/or rotational movement thereon, resulting in the intermediate ball planets being able to attain substantially nearly perfect equilibrium.

A still further object of the invention is to provide an improved power-transmitting mechanism wherein suitable size and radius of the partial-spherical bearing inserts may be determined by adapting techniques employed in cylindrical journal bearing applications.

These and other objects and advantages of the invention will become more apparent when reference is made to the following specification and the accompanying drawings, wherein:

FIG. 4 is an enlarged fragmentary view taken along the plane of line 4—4 of FIG. 3, and looking in the direction of the arrows;

FIG. 5 is an enlarged fragmentary cross-sectional view of a portion of FIGS. 3 and 4; and FIGS. 6–10 are modifications of portions of the invention.

Figures 1, 2, 3:
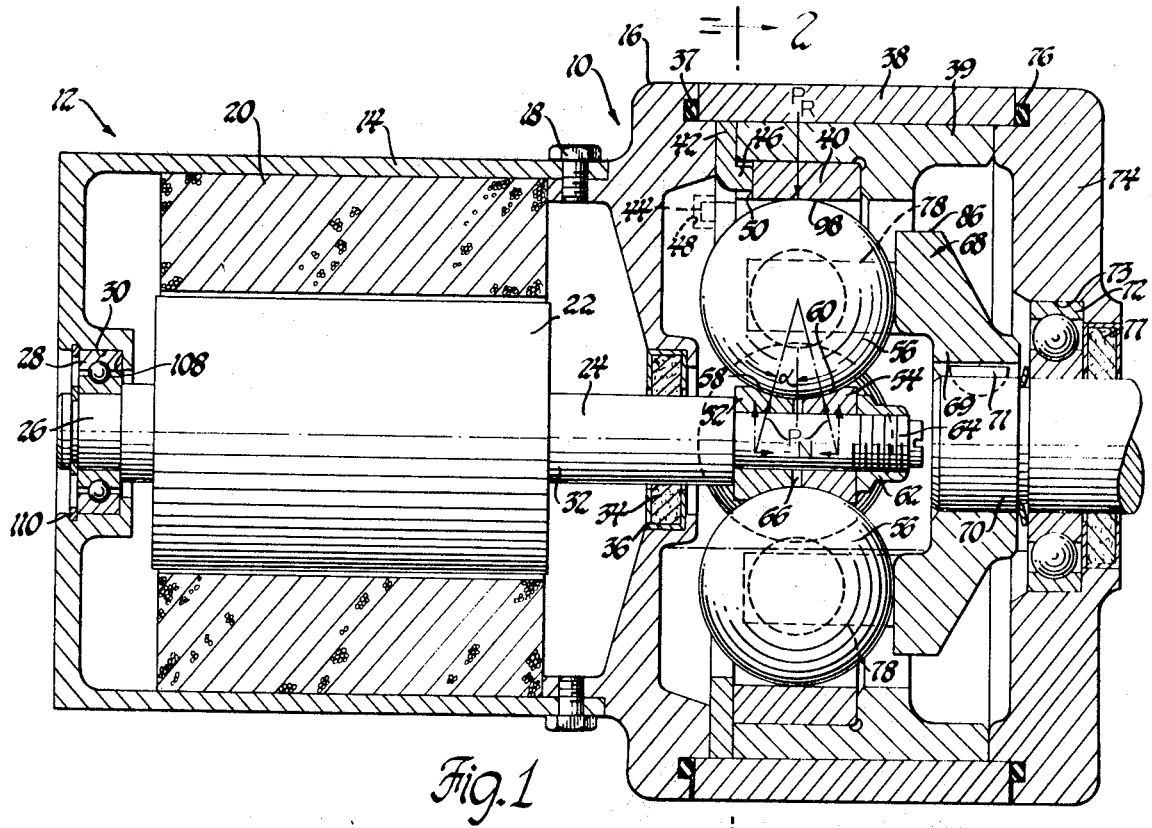
FIG. 1 is a cross-sectional view of a power-transmitting and speed-reducing friction drive mechanism embodying the invention.
FIG. 2 is a view taken along the plane of line 2—2 of FIG. 1, as if FIG. 1 were a full round view, and looking in the direction of the arrows.
FIG. 3 is an enlarged fragmentary view of a portion of FIG. 1.

Referring now to FIG. 1 in greater detail, a friction drive speed-reducing mechanism 10 is driven by a suitable prime mover, such as an electric motor 12, the latter including a motor housing 14 secured to an end cover 16 of the friction drive mechanism 10 by any suitable means, such as bolts 18. The housing 14 encompasses motor windings 20 and a rotor 22, the rotor 22 driving an input or drive shaft 24. The drive shaft 24 is supported at its outermost end 26 on bearings 28 mounted in an opening 30 formed in the motor housing 14. The other end 32 of the input shaft 24 extends through a suitable seal 34 mounted in an opening 36 in the end cover 16 into the housing 38 of the friction drive mechanism 10, the end cover 16 abutting against the housing 38, with an O-ring seal 37 therebetween.

The housing 38 encompasses an annular reaction or support member 39 and a ring member or outer race 40 fixed against rotation by a locking washer or spacer 42 having oppositely disposed peripherally spaced tangs 44 and 46 (FIG. 3) extending into slots 48 and 50 formed respectively in the end face of the cover 16 and the adjacent face of the outer race 40. A pair of split sun members or inner races 52 and 54 are mounted on the end 32 of the drive shaft 24 in any suitable manner, such as by splines, a key, or press-fit, radially inward of the outer ring member 40. A plurality of ball planets 56 are frictionally confined between the outer ring member 40 and contoured surfaces 58 and 60 formed on the inner split suns 52 and 54, respectively. A nut 62 is threadedly mounted on threads 64 formed on the end 32 of the drive shaft 24 to vary the gap 66 between the sun halves 52 and 54 to satisfy various load requirements.

A carrier 68 is mounted at its one end 69 on an output shaft 70 for rotation therewith by any suitable means, such as a key 71, the output shaft 70 being rotatably supported by bearings 72 mounted in an opening 73 formed in an outer end cover 74, the latter abutting against the housing 38, with an O-ring seal 76 therebetween. A suitable seal 77 is mounted adjacent the outer face of the bearings 72. Carrier fingers 78 extend leftward in FIG. 1 from the carrier 68 and are the remaining portion of a cylindrical drum 86 after radial passages or slots 80 (FIGS. 2 and 4), having oppositely disposed parallel walls 82 and 84, have been formed through the cylindrical wall or drum 86 of the carrier 68, the walls 82 and 84 being parallel to a plane along the radius of the intermediate ball planet 56 perpendicular to the axis of the drive mechanism 10.

As illustrated in FIG. 2, the ball planets 56 are separated from each other by the fingers 78, the parallel walls 82 and 84 serving as seats for oppositely disposed bearing inserts or shoes 88 and 90. Each of the latter includes a flat face 92 in contact with a wall 82 or 84, a partial-spherical cavity or concave face 94 (FIG. 4) adjacent a ball planet 56, and a conical outer periphery 96. In order to have maximum power capacity for a desired speed ratio, the latter determining the inner race 52, 54 O.D. and the outer race 40 I.D., it is essential that there be as many ball planets 56 as possible cooperating with the carrier fingers 78. As a result, the fingers 78, for most applications, will generally be as thin as is practical. Accordingly, the conical outer periphery 96 of he inserts 88 and 90 serve to eliminate extending outer edges and thereby facilitate rotary motion and close peripheral proximity of the inserts 88 and 90 to one another (FIG. 2), while maintaining fullface 92 contact with the wall 82 or 84. It is apparent that a number of ball planets 56 other than four could be employed where desired.

The radius "$R_1$" (FIG. 4) of the spherical cavity 94 is a predetermined amount larger than the radius "$R_2$" of the ball planet 56 to provide a hydrodynamic journal bearing relationship therewith. In such an arrangement, a film of fluid is generated therebetween which separates each ball planet 56 from the inserts 88 and 90, and supports torque load with a minimum of friction and substantially no wear. The ball planet 56 may contact the back surface 97 (FIG. 4) of each radial slot 80, inasmuch as there is merely a point contact of the ball planet 56 therewith, while both the planets 56 and the drum 86 are rotating about the axis of the drive mechanism 10. Such point contact may, in fact, serve to help maintain the axial location of the carrier 68.

It may be noted in the FIG. 1 configuration that the inner surface 98 of the outer race 40 is a straight cylindrical surface. The ball planets 56 are thus not restrained axially by the outer race 40 and, hence, all radial and axial forces are equal and opposite, resulting in the ball planets 56 being able to attain substantially nearly perfect equilibrium.

The bearing inserts 88 and 90 are completely free to move axially and radially, as well as rotationally, within the carrier slots 90. In this way, the centrifugal force and other forces acting on the ball planets 56 do not overload any portion of the shoe bearing surfaces 94. The freedom of movement of the bearing inserts or shoes 88 and 90 also permits a degree of self-alignment for the drive mechanism components and permits the ball planets 56 to run at their natural pitch circle, thus precluding the need for a precise location for the radial openings 80 in the carrier 68.

Since the ball planets 56 and the inserts 88 and 90 all rotate in the same plane, theoretically there should be no rotation of the bearing inserts 88 and 90 in a transverse direction. However, inasmuch as the carrier fingers 78 are normally as thin as is practical to accommodate a maximum number of ball planets 56 around the cylindrical drum 86, there is apt to be some torsional windup of the drum 86 which would move the shoes 88 and 90 off their exact centers, thereby shifting the deepest portion of the depression and causing the ball planets 56, which have not shifted, to cooperate with a different portion of the shoes 88 and 90, thus tending to rotate the shoes, producing even wear characteristics thereon. Such rotation of the shoes 88, 90 will be slow as a result of the frictional relationship between the surfaces 92 and 82, 84 and slippage between the shoe 88 or 90 and the ball planet 56, due to the oil film therebetween. Additionally, since it would be impracticable to assume that the flat faces 92 are perfectly flat, any normal high spot thereon would act as a fulcrum, and the resultant couple between the location of the high spot and the point which aligns with the centers of a ball 56 and both adjacent inserts 88 and 90 would cause any insert having the high spot thereon to slowly rotate about its own axis, and, as indicated above, produce even wear on the spherical face 94 thereof.

It is desirable that the flat face 92 be in full contact with the wall 82 or 84, since, if any overhang of the face 92 were present, there would be a tendency for a groove or edge to wear thereon along the edge of the wall 82 or 84. If this were to happen, radial and rotational movement of the inserts 88 and 90 would, of course, be hampered. Such full face contact may be controlled by coordinating the particular taper of the conical periphery 96 of the inserts 88 and 90, and the radial width of the fingers 78, in conjunction with the desired maximum number of ball planets 56 for a particular speed ratio.

Since a maximum number of ball planets 56 are generally employed, as indicated above, the bearing inserts 88 and 90 are maintained as thin and light as possible. Hence, the centrifugal effect of the freely mounted inserts 88 and 90 acting on the ball planets 56 is relatively small, as evidenced by the following:

Where $F_c$ = centrifugal force on the shoe, in lbs.,
$W_s$ = the weight of the shoe in lbs.,
$R_c$ = the radius of the carrier in inches, and
$N_c$ = rotational speed of the carrier in r.p.m.s, $$F_c = \frac{W_s}{g} \cdot R_c \cdot w_c^2 = \frac{W_s}{g} \cdot R_c \left(\frac{2\pi N_c}{60}\right)^2$$

$$= \frac{W_s \cdot R_c \cdot N_c^2}{\frac{(386.09)(3600)}{4\pi^2}} = \frac{W_s \cdot R_c \cdot N_c^2}{35,200}$$

When, for example, $W_s = 5$ gms. or .011 lb., and $R_c = .809$ in., $$F_c = \frac{(.011)(.809)}{.0352}\left(\frac{N_c}{10^3}\right)^2 = .2525\left(\frac{N_c}{10^3}\right)^2$$

Or,

| at $N_c =$ | $F_c =$ |
| --- | --- |
| 300 | .0227 |
| 500 | .0631 |
| 1,000 | .2525 |
| 1,500 | .5685 |
| 2,000 | 1.010 |
| 2,500 | 1.580 |
| 3,000 | 2.270 |
| 3,500 | 3.095 |
| 4,000 | 4.040 |
| 4,500 | 5.110 |
| 5,000 | 6.310 |

Consequently, for typical torques on the carrier 68, the drive mechanism 10 is capable of operating at relatively high speed without adding substantially to the total load between the ball planet 56 and the shoe 88 or 90, due to the action of centrifugal force.

The size of the shoe 88 or 90 and the radius of the shoe cavity 94 should be carefully selected, and such may be accomplished by adapting techniques for calculating journal bearings to the partial-spherical bearing inserts 88 and 90. More specifically, the known theory of hydrodynamic lubrication relative to cylindrical journal bearings or roller-shaped bearings employs an L/D ratio as an essential element in pertinent tables and graphs, wherein "L—38 is the length of the cylinder and "D" is the diameter of the cylinder, L·D being the projected area of the roller, as evidenced by pages 89–91, including table 4–2, of *Pinkus & Sternlicht* text (McGraw Hill, 1961). It is proposed that the diameter of the ball planet 56 be considered equal to "D" of the L/D ratio and that "L" first be determined which is comparable to the length "L" of an equivalent area roller or journal bearing. Thereafter, suitable projected spherical bearing area, clearance and/or film thickness, power loss and Sommerfeld Number may be readily determined using known formulas, tables, charts and graphs.

For more efficient operation, the surface 94 of the bearing insert 88 or 90 adjacent the ball planet surface should be of good bearing material composition, such as babbitt, bronze, bearing aluminum or some other leaded compound. The bearing inserts or shoes 88 or 90 used in the drive shown in FIG. 1 include a lining 99 consisting of a suitable bearing material, as illustrated in FIG. 5, to serve as the bearing surface 94. This material may vary in thickness from 0.0002 inch to 0.030 inch thick, and may initially be bonded to a flat steel sheet 0.005 inch to 0.060 inch or more inches thick. The dual-layer sheet would then be run through a one or more stage suitable press wherein the shape of the bearing inserts or shoes would be coined as desired. Such coining process can produce bearing inserts or shoes which are substantially completely finished and accurately dimensioned. A chamfer 100 (FIG. 5) is formed on the edge of the partial-spherical face 94 to facilitate the entrance of lubricant between the face 94 and the ball planet 56. If desired, either the carrier fingers 78 or the flat bearing insert face 92 may be coated with a suitable friction- or wear-reducing material to facilitate relative movement between the face 92 and the wall 82 or 84.

Due to the wedge action resulting from the varying of the gap 66 by rotating the nut 62, between the ball planets 56 and the sun halves 52 and 54, the normal forces, "$P_N$," at intermediate points on each of the contoured surfaces 58 and 60, as defined by the two angles $\alpha$ (FIG. 1), the frictional cooperation between each of the sun halves 52 and 54 and the ball planets 56 may be controlled.

The relationship between the normal forces "$P_N$" and "$P_R$" on the ball planets 56 at the inner races 52 and 54 and the outer race 40, respectively, is:

$$P_R = 2P_N \cos\alpha \text{(See FIG. 1.)}$$

The tangential forces "F" (FIG. 2) at the ball-race contacting surfaces necessary for torque transmittal are a product of the normal forces and the coefficient of traction at the contact. These tangential forces, when multiplied by the radius from the center of the drive mechanism 10 to the points of contact, are equal to the torque which can be transmitted through the drive mechanism. The initial gap 66 between the opposing faces of the suns 52 and 54 is predetermined by considering the "springiness" or spring rates of the various components in such a way that when the gap 66 is taken up and an axial force produced thereby, sufficient normal load is generated to prevent contact slippage under operating conditions. These tangential forces are transmitted from the ball planets 56 through the bearing inserts 88 and 90, and thence through the fingers 78 and the body of the carrier 68 to the output shaft 70.

The total force or resultant vector force with which the ball planets 56 push on the bearing inserts 88 or 90 consists of the tangential force vector due to torque and a substantially radial shear force vector due to the associated oil wedge. It is apparent that, under driving conditions and without regard to centrifugal force, there would be a tendency for one bearing insert to move radially inwardly and the other to move radially outwardly in response to the rotation of the intermediate ball planet 56. This would serve to shift the resultant vector force (FIG. 2) from a horizontal force, as illustrated, to a force normal to the adjacent curved bearing insert surface 94. The oil film wedges will be symmetrical about the point of normality.

Under very high speed or load conditions, it might be advantageous to use a shoe 102 (FIG. 6) including a so-called "-gothic arch"-type shoe cavity 104. Here a gothic arch-type or spheroidal cavity 104 is generated by displacing the stationary center "A" (FIG. 4) for the radius "$R_1$" of the shoes 88 or 90 with a center which may be any point, such as "B" or "C" (FIG. 6), on a circular path having a diameter "D" and located some predetermined distance from the center "A," generating a radius "$R_3$," resulting in a ring or annulus 106 contact rather than a partial-spherical contact. Such a shoe is less sensitive to centrifugal force and is capable of carrying more load. The width "E" of the contacting annulus 106 may be varied by varying the diameter "D." The shoe 102 may, of course, include a lining similar to the lining 99 of the shoe 88 or 90 of FIG. 5.

As illustrated in FIG. 7, rather than the flat radial slot surfaces 82 and 84, the oppositely disposed sides of the radial passages 80 may be formed to include a plurality of 1° to 10° slopes 116 terminating in ridges 118, whose edges are parallel to A plane along the radius of the intermediate ball planet 56 perpendicular to the axis of the drive mechanism 10. This arrangement assures that there will be films of lubricant between the backs of the bearing inserts 88 and 90 and the adjacent surfaces of the carrier drum 86 where necessary to facilitate relative bearing insert 88, 90 movement. The sloped surfaces 116 may, of course, slope away from a particular ridge 118 in only one direction, as illustrated in FIGS. 7 and 8, or may slope from both sides thereof, as illustrated in FIG. 9. The slope is exaggerated in the Figures for purposes of illustration. The ridges 118 on the surfaces 82 and 84 are preferably formed to extend radially outwardly from the axis of the bearing insert 88 or 90, as illustrated in FIGS. 7—9. If desired, the ridge 118 may include a flat portion (not shown) of some predetermined width.

It may be noted in FIG. 1 that the bearing 28 at the left end 26 of the input shaft 24 provides radial support for the left portion of the rotor 22 and locates the rotor axially relative to the traction drive housing 38 by virtue of the bearing 28 being confined between a shoulder 108 and a retainer ring 110. The right-hand portion of the rotor 22 is radially supported by the ball planets and the races of the traction drive mechanism 10. Inasmuch as the outer race 40 includes a straight cylindrical inside surface 98, the ball planets 56 are free to position themselves axially anywhere along the inner surface 98 of the outer race 40 to suit the axially restrained input shaft 24. Thus, a possible alignment problem between the inner and outer races 52, 54 and 40, respectively, is eliminated.

An alternate arrangement is illustrated in FIG. 10, wherein an annular contoured surface 112 is formed on the inner surface of an outer race 114. The left or outermost end 26 of the input shaft 24 is axially unrestrained since the bearing 28 may move axially along the cylindrical surface of the opening 30 in the motor housing 14, the retaining ring 110 and the shoulder 108 being spaced farther apart than in the FIG. 1 configuration. In the FIG. 10 embodiment, the planetary members 52, 54, 56 and 114 of the traction mechanism 10 serve to locate the rotor 22 axially, as well as to radially support the right end thereof:

It should be apparent that the invention provides an improved frictional power-transmitting planetary drive system wherein the components may attain substantially perfect equilibrium with a minimum of friction and wear regardless of torque load.

It should be further apparent that the invention provides an improved power-transmitting mechanism wherein suitable size and radius of the partial-spherical bearing inserts included therein to accomplish the above may be determined by adapting techniques employed in cylindrical journal bearing applications.

While several embodiments of the invention have been shown and described, other modifications thereof are possible.

I claim:

1. A friction drive power-transmitting mechanism comprising a housing, a reaction member secured to said housing, a power input member, a power output member, a carrier having a cylindrical wall rotatably mounted in said housing and being connected to one of said members for transmitting torque, a plurality of substantially equally spaced radial passages having oppositely disposed parallel side walls formed in said cylindrical wall of said carrier, an inner race connected to a second of said members, an outer race mounted radially outwardly of said parallel sidewalls and connected to a third of said members, a plurality of circular bearing inserts each having a flat face formed thereon for being mounted in said radial passages in contact with one of said oppositely disposed parallel sidewalls, a concave partial-spherical surface formed on the opposite face of each of said bearing inserts, a plurality of ball planets, each mounted between opposing concave partial-spherical surfaces of said bearing inserts and in rotational frictional contact with said inner and outer races, said bearing inserts being free to move radially, axially and rotatably relative to said parallel sidewalls as required to cooperate with the rotational path of said ball planets, and each of said bearing inserts having a larger spherical radius than the radius of said ball planets providing a wedged opening between said ball planet and each of said concave partial-spherical surfaces whereby lubricant in said wedged openings tends to lift said ball planets for full hydrodynamic spherical bearing lubrication.

2. The mechanism described in claim 1, wherein said partial-spherical surface on said bearing inserts is formed from a stationary center.

3. The mechanism described in claim 1, wherein said partial-spherical surface on said bearing inserts is formed from a rotatable center.

4. A friction drive power-transmitting mechanism comprising a housing a reaction member secured to said housing, a power input member, a power output member, a carrier having a cylindrical wall rotatably mounted in said housing and being connected to said power output member for transmitting torque, a plurality of substantially equally spaced radial passages having oppositely disposed parallel sidewalls formed in said cylindrical wall of said carrier, an inner race connected to said power input member, an outer race mounted radially outwardly of said parallel sidewalls and connected to said reaction member, a plurality of circular bearing inserts each having a flat face formed thereon for being mounted in said radial passage in contact with one of said oppositely disposed parallel side walls, a concave partial-spherical surface formed on the opposite face of each of said bearing inserts, a plurality of ball planets, each mounted between opposing concave partial-spherical surfaces of said bearing inserts and in rotational frictional contact with said inner and outer races, said bearing inserts being free to move radially, axially and rotatably relative to said parallel side walls as required to cooperate with said rotating ball planets, and each of said bearing inserts having a larger spherical radius than the radius of said ball planets providing a wedged opening between said ball planet and each of said concave partial-spherical surfaces whereby lubricant in said wedged openings tends to lift said ball planets for full hydrodynamic spherical bearing lubrication.

5. A friction drive power-transmitting mechanism comprising a housing, a reaction member secured to said housing, a power input member, a power output member, a carrier having a cylindrical wall rotatably mounted in said housing and being connected to said power output member for transmitting torque, a plurality of substantially equally spaced radial passages having oppositely disposed parallel sidewalls formed in said cylindrical wall of said carrier, an inner race connected to said power input member, an outer race mounted radially outwardly of said parallel sidewalls and connected to said reaction member, a plurality of circular bearing inserts each having a flat face formed thereon for being mounted in said radial passage in contact with one of said oppositely disposed parallel sidewalls, a concave partial-spherical surface formed on the opposite face of each of said bearing inserts, a plurality of ball planets, each mounted between opposing concave partial-spherical surfaces of said bearing inserts and in frictional contact with said inner and outer races, said bearing inserts being free to move radially, axially and rotatably relative to said parallel sidewalls as required to cooperate with said ball planets, and each of said bearing inserts having a chamber formed on the edge of the partial-spherical surface thereof to facilitate the entrance of a lubricant therepast and a larger spherical radius than the radius of said ball planets providing a wedged opening between said ball planet and each of said concave partial-spherical surfaces whereby said lubricant in said wedged openings tends to lift said ball planets for full hydrodynamic spherical bearing lubrication.

6. The mechanism described in claim 5, wherein each of said oppositely disposed parallel sidewalls has an area whose radial width is greater than the diameter of each of said flat faces of said circular bearing inserts to assure full face contact therebetween at all times, while said bearing inserts are moving relative to said parallel sidewalls.

7. The mechanism described in claim 5, and a plurality of radial grooves formed on each of said parallel sidewalls of said carrier to assure a plurality of oil wedges intermediate each of said parallel sidewalls and each of said flat faces of said bearing inserts.

8. A friction drive power-transmitting and speed-reducing mechanism comprising a housing, a reaction member secured to said housing, an input shaft, a rotor for driving said input shaft, means for axially supporting said rotor and said input shaft, an output shaft, a carrier having a cylindrical wall rotatably mounted in said housing and being connected to said output shaft for transmitting torque, a plurality of substantially equally spaced radial passages having oppositely disposed parallel sidewalls formed in said cylindrical wall of said carrier, an inner race connected to said input shaft, an outer race mounted radially outwardly of said parallel sidewalls and connected to said reaction member, a plurality of bearing inserts each having a flat face formed thereon for being mounted in said radial passage in full face contact with one of said oppositely disposed parallel sidewalls, a concave partial-spherical surface formed on the opposite face of each of said bearing inserts, a plurality of ball planets, each mounted between opposing concave partial-spherical surfaces of said bearing inserts and in frictional contact with said inner and outer races, said bearing inserts being free to move radially, axially and rotatably relative to said parallel sidewalls for rotational cooperation with said ball planets as said ball planets rotate around the inner surface of said outer race.

9. The mechanism described in claim 8, wherein said means for axially supporting said rotor and said input shaft comprises a rotor housing and bearing means mounted on said input shaft and said rotor housing for preventing said rotor from moving axially.

10. The mechanism described in claim 8, wherein said means for axially supporting said rotor and said input shaft comprises a contoured surface formed on the inside surface of said outer race for preventing said ball planets, said inner race, said input shaft and said rotor from moving axially.

11. A friction drive power-transmitting mechanism comprising a housing, a reaction member secured to said housing, a power input member, a power output member, a carrier having a cylindrical wall mounted in said housing and being connected to one of said members for transmitting torque, a plurality of substantially equally spaced radial passages having oppositely disposed parallel sidewalls formed in said cylindrical wall of said carrier, an inner race connected to a second of said members, an outer race mounted radially outwardly of said parallel sidewalls and connected to a third of said members, a plurality of circular bearing inserts each having a flat face formed thereon for being mounted in said radial passages with the entire circular flat face completely in relatively movable bearing contact with one of said oppositely disposed parallel sidewalls, a concave partial-spherical bearing surface formed on the opposite face of each of said bearing inserts, a plurality of ball planets, each mounted between opposing concave partial-spherical surfaces of said bearing inserts and in rotational frictional contact with said inner and outer races, said bearing inserts being free to move radially and axially with movement of the associated ball planet and to move rotatably relative to said associated ball planet and said parallel sidewalls as required to cooperate with the rotational path of said ball planets, each of said bearing inserts being caused to slowly rotate about the axis thereof in response to any torsional windup of said cylindrical wall of said carrier causing said bearing insert to move away from a position of having said axis aligned with the axis of the oppositely disposed bearing insert and each of said bearing inserts having said spherical bearing surface having a larger spherical radius than the radius of said ball planets providing a wedged opening between said ball planet and each of said concave partial-spherical surfaces whereby lubricant in said wedged openings tends to lift said ball planets for full hydrodynamic spherical bearing lubrication, regardless of whether the deepest portion of said concave partial-spherical surface has moved relative to the outermost point of the spherical surface of said adjacent ball planet.

PO-1050
(5/69)

UNITED STATES PATENT OFFICE
CERTIFICATE OF CORRECTION

Patent No. 3,600,976      Dated August 24, 1971

Inventor(s) Lubomyr O. Hewko

It is certified that error appears in the above-identified patent and that said Letters Patent are hereby corrected as shown below:

Col. 2, line 44,    "he" should read -- the --.

Col. 4, line 13,    "L-38" should read -- "L" --;
        line 23,    "formulas" should read -- formulae --.

Col. 5, at or about line 30,    "A plane" should read
                                    -- a plane --.

Col. 7, line 18,    "chamber" should read -- chamfer --.

Signed and sealed this 26th day of December 1972.

(SEAL)
Attest:

EDWARD M. FLETCHER, JR.                      ROBERT GOTTSCHALK
Attesting Officer                             Commissioner of Patents